UNITED STATES PATENT OFFICE.

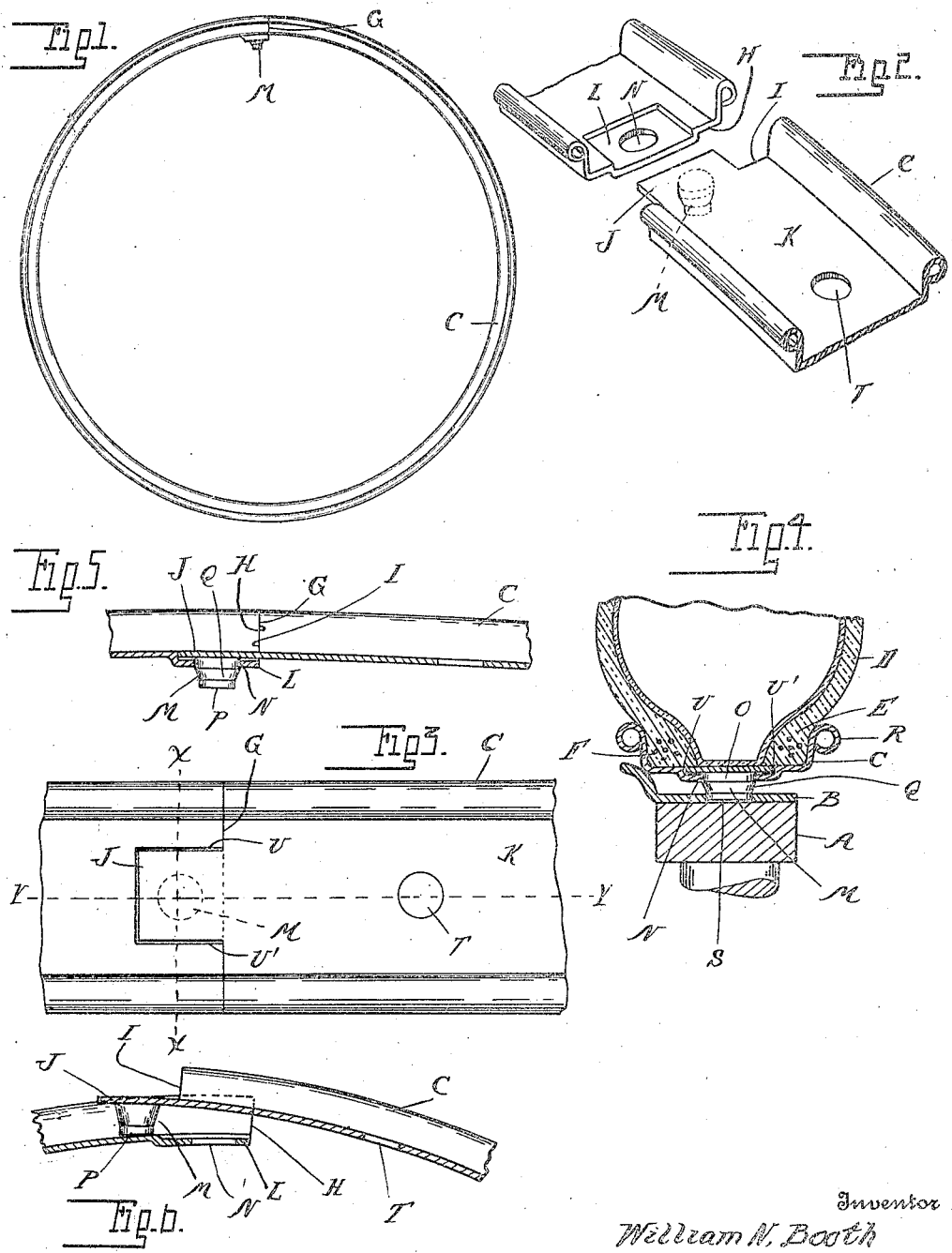

WILLIAM N. BOOTH, OF DETROIT, MICHIGAN, ASSIGNOR TO KELSEY WHEEL COMPANY, INC., OF DETROIT, MICHIGAN, A CORPORATION OF NEW YORK.

VEHICLE-WHEEL RIM.

1,317,478.  Specification of Letters Patent.  Patented Sept. 30, 1919.

Application filed May 18, 1916. Serial No. 98,319.

*To all whom it may concern:*

Be it known that I, WILLIAM N. BOOTH, a citizen of the United States of America, residing at Detroit, in the county of Wayne and State of Michigan, have invented certain new and useful Improvements in Vehicle-Wheel Rims, of which the following is a specification, reference being had therein to the accompanying drawings.

This invention relates to vehicle wheel rims and refers more particularly to that type of rim known as the demountable rim.

Where rims of this character are used to receive pneumatic tires, particularly those tires in which the beads are non-extensible, the rim is often split transversely to permit the contraction of the circumference of the rim to less than that of the tire bead. In such constructions it is necessary to provide means for alining and holding the meeting ends of the rim in position after the tire is in place, and the present invention contemplates an improved and simplified construction for holding in alinement the meeting ends of the split rim.

Among the objects of the invention are to provide a rim of the character above referred to, in which the securing means for the ends of the split rim are formed integral with the main body of the rim; to so construct and arrange the inter-locking parts that they can be readily engaged and dis-engaged, but when in locked position will hold the meeting ends of the rim from either circumferential or transverse movement; to so construct and arrange the inter-locking parts of the rim that a substantially smooth surface will be maintained on the tire receiving side of the rim; and in general to provide a vehicle wheel of the demountable type which is simplified in construction and operation and in which the cost of manufacture is materially reduced. The invention further resides in such features of the connection and arrangement at the meeting ends of the rim as will more fully hereinafter appear.

In the drawings:

Figure 1 is a side elevational view of a vehicle wheel rim embodying my invention;

Fig. 2 is a fragmentary perspective view showing the meeting ends of the rim, detached from one another;

Fig. 3 is a fragmentary plan view of the locking joint;

Fig. 4 is a cross section on the line $x$—$x$ of Fig. 3;

Fig. 5 is a longitudinal section on the line $y$—$y$ of Fig. 3; and

Fig. 6 is a longitudinal section showing the ends moved to a contracted position of the rim.

In general, A designates the felly of the wheel, B the permanent rim and C the demountable rim carrying the pneumatic tire casing D. In the construction shown in the drawings this casing is of the straight side type, its beads E being reinforced by wires F so that the inner circumference of the tire casing is non-extensible. For permitting the attaching and detaching of the tire to and from the demountable rim C the latter is transversely split at G and its meeting ends H and I provided with inter-locking members which in the attached position of the parts normally hold the ends from relative movement, but when the demountable rim is removed will allow the ends H and I to be overlapped sufficiently to contract the circumference of the rim to less than that of the tire bead.

In detail this inter-locking joint comprises a tongue J formed as an integral extension of the main body portion or web K of the rim. In the opposite end of the rim there is formed a seat L preferably produced by offsetting a portion of the metal of the main body of the rim inwardly. The amount of offset is sufficient so that when the tongue J is positioned in the seat L, its outer surface will be substantially flush with the outer surface of the rim, thus presenting a smooth tire receiving surface, as shown in Figs. 4 and 5. For holding the meeting ends of the rim in position the tongue J is provided with a pin M which is adapted to project through an opening N in the seat or recessed portion L. This pin has a cylindrical base O adapted to fit within the opening N and a smaller cylindrical end P connected by an inclined portion Q, the latter serving to draw the parts into alinement when the pin is sprung into the opening N.

In dis-engaging the meeting ends of the rim, the end H is sprung radially inward a sufficient distance to draw the pin out of the opening N, thus allowing the end H to be slid beneath the end I, and the circumference of the rim can then be contracted sufficiently to permit of the tire being drawn off over one of the side flanges R. In applying the tire to the rim the inclined surface Q of the pin aids in forcing the ends into proper alinement while the smaller end P of the pin may be extended into locking engagement with an aperture S in the permanent rim so as to prevent any creeping of the demountable rim around the felly.

In order to prevent rusting of the overlapping parts together, the seat L is preferably inclined toward the center, as shown in Fig. 4, thus giving only line contacts U and U' between the seat and the tongue J, and at a convenient distance from its meeting ends the rim is provided with the usual valve stem opening T. In place of forming the pin M with the two cylindrical parts connected by an inclined portion, it may be constructed with the base O and inclined portion Q as a single inclined surface tapering toward the smaller cylindrical portion P, as indicated in Fig. 6.

A rim constructed as above described is simplified both in construction and in operation, and has the further advantage of allowing an integral construction.

What I claim as my invention is:

1. In a split rim, the combination with a main body portion having meeting ends, of a tongue projecting beyond one of the ends, the other end having a depressed seat extending from the edge of the main body portion for receiving said tongue and a pin carried by said tongue for holding the latter in engagement with said seat.

2. In a split rim, the combination with a main body portion having meeting ends, of an integral tongue projecting beyond one of the ends, and adapted to overlap a portion of the other end, the overlapped portion of the other end having a recess or seat inclined to provide a relatively small area of contact between said tongue and seat.

In testimony whereof I affix my signature.

WILLIAM N. BOOTH.